(12) United States Patent
Oyobe et al.

(10) Patent No.: US 8,341,971 B2
(45) Date of Patent: Jan. 1, 2013

(54) AIR CONDITIONING CONTROL DEVICE FOR VEHICLE

(75) Inventors: Hichirosai Oyobe, Toyota (JP); Yoshinori Fujitake, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 609 days.

(21) Appl. No.: 12/452,023

(22) PCT Filed: May 20, 2008

(86) PCT No.: PCT/JP2008/059609
§ 371 (c)(1), (2), (4) Date: Dec. 11, 2009

(87) PCT Pub. No.: WO2008/155977
PCT Pub. Date: Dec. 24, 2008

(65) Prior Publication Data
US 2010/0132388 A1    Jun. 3, 2010

(30) Foreign Application Priority Data
Jun. 18, 2007 (JP) ................................. 2007-160179

(51) Int. Cl.
  G05D 23/00 (2006.01)
  B60H 1/32 (2006.01)
(52) U.S. Cl. ................ 62/157; 62/231; 62/244; 236/1 C
(58) Field of Classification Search .................... 62/157, 62/231, 244, 259.2; 236/1 C
See application file for complete search history.

(56) References Cited

U.S. PATENT DOCUMENTS

| 5,555,737 | A | | 9/1996 | Takeo et al. |
| 6,158,225 | A | * | 12/2000 | Muto et al. ........................ 62/3.7 |
| 6,745,582 | B1 | * | 6/2004 | Urbank et al. .................. 62/133 |
| 7,441,414 | B2 | * | 10/2008 | Ziehr et al. ...................... 62/244 |
| 7,823,399 | B2 | * | 11/2010 | Egawa ............................ 62/178 |
| 8,118,237 | B2 | * | 2/2012 | Vyas et al. .................. 236/46 C |
| 2004/0194479 | A1 | | 10/2004 | Umebayashi et al. |

(Continued)

FOREIGN PATENT DOCUMENTS
DE    103 16 106 A1    10/2004
(Continued)

OTHER PUBLICATIONS

International Preliminary Report on Patentability for International Application No. PCT/JP2008/059609, issued Jan. 21, 2010.

(Continued)

*Primary Examiner* — Marc Norman
(74) *Attorney, Agent, or Firm* — Oliff & Berridge, PLC

(57) ABSTRACT

An air conditioning control device for a vehicle has an air conditioner for conditioning air in a vehicle interior, an input receiving unit for receiving inputs of both planned departure time of the vehicle and a target temperature in the vehicle interior, a pre-air-conditioning control unit for starting operation of the air conditioner at an air conditioning start time before the planned departure time so that the temperature in the vehicle interior at the planned departure time becomes the target temperature, and an outdoor air temperature acquisition unit for acquiring outdoor air temperature. The pre-air-conditioning control unit changes the air conditioning operation start time based on the outdoor air temperature acquired by the outdoor air temperature acquisition unit.

14 Claims, 5 Drawing Sheets

U.S. PATENT DOCUMENTS

2007/0119959 A1  5/2007  Wieszt

FOREIGN PATENT DOCUMENTS

| | | |
|---|---|---|
| JP | A-5-32029 | 4/1993 |
| JP | A-7-073906 | 3/1995 |
| JP | A-7-193901 | 7/1995 |
| JP | A-2000-233648 | 8/2000 |
| JP | A-2001-063347 | 3/2001 |
| JP | A-2001-258177 | 9/2001 |
| JP | A-2004-256092 | 9/2004 |
| WO | WO 2007/023340 A1 | 3/2007 |

OTHER PUBLICATIONS

Sep. 27, 2011 Search Report issued in European Application No. 08753116.6.

International Search Report for International Application No. PCT/JP2008/059609, issued Jul. 1, 2008.

Office Action for Japanese Patent Application No. 2007-160179, issued Jul. 1, 2008.

Office Action for Japanese Patent Application No. 2007-160179, issued Feb. 10, 2009.

* cited by examiner

AIR CONDITIONING CONTROL DEVICE FOR VEHICLE

TECHNICAL FIELD

The present invention relates to an air conditioning control device for a vehicle. In particular, the present invention relates to an air conditioning control device for a vehicle, which brings an air conditioner into operation before planned departure time of the vehicle, or performs so-called pre-air conditioning.

BACKGROUND ART

In a vehicle capable of traveling by electric power supplied from an electricity storage device to an electric motor (e.g., plug-in hybrid vehicle or electric automobile), an air conditioning control device for performing pre-air conditioning has been proposed, in which operation of an air conditioner is started before planned departure time of the vehicle in order to make the temperature of the vehicle interior appropriate when occupants get in the vehicle (for example, see JP 2001-63347 A). In JP 2001-63347 A, pre-air conditioning is performed when an operator turns on a pre-air-conditioning request switch. During a period of charging an electricity storage device (secondary battery) using an external power source, pre-air conditioning is performed using electric power supplied from the external power source, and until a predetermined period has elapsed from the time that the external power source is detached, pre-air conditioning is performed using electric power supplied from the electricity storage device. Further, the air-conditioning capability during pre-air conditioning is adapted to be variable as time elapses.

In JP 2001-63347 A, however, as the pre-air-conditioning operation starts when an operator turns on the pre-air-conditioning request switch, the duration for pre-air conditioning is determined by the operator. As such, there is a case where the vehicle interior temperature does not become appropriate by the planned departure time (boarding time) of the vehicle, depending on climate conditions of the place where the vehicle is located, so that pre-air conditioning may not be properly performed.

Further, as electric power that can be charged into the electricity storage, device decreases when the temperature is low or high, if the electricity storage device has been charged by an external power source before pre-air conditioning is performed when the temperature is low or high, the time required for charging the electricity storage device increases, whereby the total time required for charging the electricity storage device and pre-air conditioning becomes longer. Consequently, there is a case where a sufficient time for pre-air conditioning cannot be secured, so that pre-air conditioning may not be properly performed.

DISCLOSURE OF THE INVENTION

The present invention is directed to providing an air conditioning control device for a vehicle, which is capable of performing pre-air conditioning more appropriately by starting operation of an air conditioner before planned departure time of the vehicle.

An air conditioning control device for a vehicle, according to the present invention, includes an air conditioner for conditioning the air in a vehicle interior, an input receiving unit for receiving inputs of a planned departure time of the vehicle and a target temperature in the vehicle interior, a pre-air-conditioning control unit for starting operation of the air conditioner at an air conditioning operation start time before the planned departure time so that the temperature in the vehicle interior at the planned departure time becomes the target temperature, and an outdoor air temperature acquisition unit for acquiring an outdoor air temperature. The pre-air-conditioning control unit changes the air conditioning operation start time based on the outdoor air temperature acquired by the outdoor air temperature acquisition unit.

Further, an air conditioning control device for a vehicle, according to the present invention, includes an air conditioner for conditioning the air in a vehicle interior, an input receiving unit for receiving inputs of a planned departure time of the vehicle and a target temperature of the vehicle interior, and a pre-air-conditioning control unit for starting operation of the air conditioner at an air conditioning operation start time before the planned departure time so that the temperature in the vehicle interior at the planned departure time becomes the target temperature. The air conditioner is operable by an external power source capable of charging an electricity storage device installed in the vehicle interior, and the air conditioning control device includes an electricity storage device temperature acquisition unit for acquiring the temperature of the electricity storage device. When the electricity storage device is charged by the external power source before the planned departure time, the pre-air-conditioning control unit changes the air conditioning operation start time based on the temperature of the electricity storage device acquired by the electricity storage device temperature acquisition unit.

Further, an air conditioning control device for a vehicle, according to the present invention, includes an air conditioner for conditioning the air in a vehicle interior, an input receiving unit for receiving inputs of a planned departure time of the vehicle and a target temperature of the vehicle interior, a pre-air-conditioning control unit for starting operation of the air conditioner at an air conditioning operation start time before the planned departure time so that the temperature in the vehicle interior at the planned departure time becomes the target temperature, and a climate information acquisition unit for acquiring climate information. The pre-air-conditioning control unit changes the air conditioning operation start time based on the climate information acquired by the climate information acquisition unit.

Further, a vehicle according to the present invention includes the air conditioning control device according to the present invention, and is capable of traveling by means of electric power supplied from an electricity storage device to an electric motor.

According to the present invention, pre-air conditioning in which operation of the air conditioner is started before the planned departure time of the vehicle can be performed more appropriately.

BEST MODE FOR CARRYING OUT THE INVENTION

Hereinafter, preferable embodiments of the present invention will be described in accordance with the drawings.

First Embodiment

Figure 1:
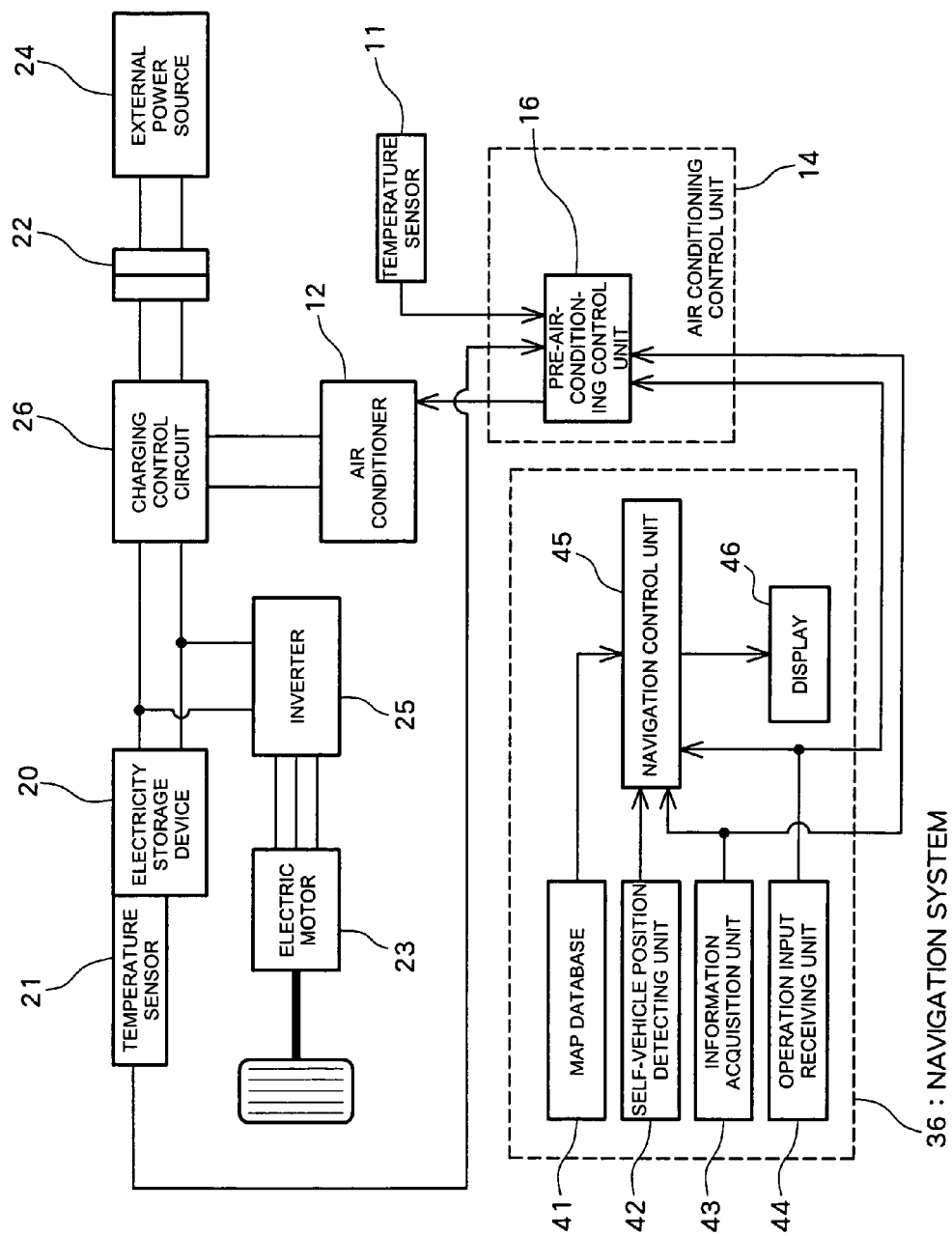
FIG. 1 is a diagram showing the schematic configuration of a vehicle having an air-conditioning control device according to a first embodiment of the present invention.

FIG. 1 is a diagram showing the schematic configuration of a vehicle having an air-conditioning control device according to a first embodiment of the present invention. The vehicle of the present embodiment is a plug-in hybrid vehicle or an electric automobile capable of traveling by electric power supplied from an electricity storage device 20 to an electric motor 23 for driving the vehicle. The vehicle of the present embodiment is provided with the electricity storage device 20, a navigation system 36, an air conditioner 12, and an air-conditioning control unit 14, to be described below.

The electricity storage device 20, which is chargeable and dischargeable, is constituted of a secondary battery such as a lithium-ion battery and stores electrical energy. The electricity storage device 20 of the present embodiment is installed in the vehicle interior, together with a temperature sensor 21 for detecting temperature τb of the electricity storage device 20. DC power from the electricity storage device (secondary battery) 20 is converted to AC power by an inverter 25 for example, and then supplied to the electric motor 23 for driving the vehicle, whereby the power is converted to the power of the electric motor 23 and used for travel of the vehicle. As the vehicle has an attachment plug 22 for charging, the electricity storage device 20 can be charged by connecting an external power source 24 to the attachment plug 22. When the electricity storage device 20 is charged by the external power source 24, a charging control circuit 26 controls charging of the electricity storage device 20.

The navigation system 36 includes a map database 41, a self-vehicle position detecting unit 42, an information acquisition unit 43, an operation input receiving unit 44, a navigation control unit 45, and a display 46. Although the navigation system 36 is operable by electric power from the electricity storage device 20, when the external power source 24 is connected to the attachment plug 22, the navigation system 36 is also operable by electric power from the external power source 24.

The map database 41 stores road map data. The self-vehicle position detecting unit 42 detects the present location of the self vehicle using a GPS for example, and outputs a signal indicating the present location of the self vehicle to the navigation control unit 45. The information acquisition unit 43 receives traffic information such as traffic jam information and regulation information from the outside via communications using VICS (registered trademark) for example, and output signals indicating the traffic information to the navigation control unit 45. The information acquisition unit 43 is also able to receive climate information including at least one of weather, outdoor air temperature and outdoor air humidity via communication with the outside of the vehicle. The operation input receiving unit 44 receives inputs by the operator including the destination of the vehicle, setting of display/non-display of guide routes, and setting of display/non-display of traffic information, and outputs signals indicating those inputs to the navigation control unit 45.

The navigation control unit 45 displays the present location of the self vehicle detected by the self-vehicle position detection unit 42 and a road map around the present location of the self vehicle read out from the map database 41, on the display 46. If it is set to display a guide route, the navigation control unit 45 displays a guide route over the road map on the display 46, and if it is set to display traffic information, the navigation control unit 45 displays traffic information over the road map on the display 46.

The air conditioner (air conditioning device) 12 conditions air inside the vehicle interior. The vehicle interior has a temperature sensor 11 for detecting the vehicle interior temperature τc. Although the air conditioner 12 is operable by electric power from the electricity storage device 20, when the external power source 24 is connected to the attachment plug 22, the air conditioner 12 is also operable by electric power from the external power source 24. The air-conditioning control unit 14 controls the air conditioner 12. In the present embodiment, the air-conditioning control unit 14 includes a pre-air-conditioning control unit 16 for performing pre-air conditioning, that is, allowing the air conditioner 12 to start operation at an air-conditioning operation start time t2 before a planned departure time (boarding time) t1 of the vehicle such that the vehicle interior temperature τc becomes a target temperature τ0 at the planned departure time t1. When performing the pre-air conditioning, the operation input receiving unit 44 can receive inputs, by the operator, of a request for performing pre-air conditioning, the planned departure time t1 of the vehicle, and the target temperature τ0 of the vehicle interior, and output signals indicating those inputs to the pre-air-conditioning control unit 16. Upon receiving the request for performing pre-air conditioning from the operation input receiving unit 44, the pre-air-conditioning control unit 16 determines an air-conditioning operation start time t2 necessary for causing the vehicle interior temperature τc to be the target temperature τ0 at the planned departure time t1 based on the planned departure time t1 and the target temperature τ0, and controls the air conditioner 12 after the operation has been started. For example, if the vehicle interior temperature τc detected by the temperature sensor 11 is lower than the target temperature τ0, the vehicle interior is heated such that the vehicle interior temperature τc rises. In contrast, if the vehicle interior temperature τc detected by the temperature sensor 11 is higher than the target temperature τ0, the vehicle interior is cooled so that the vehicle interior temperature τc drops. Further, when performing pre-air conditioning, it is also possible to control the air conditioner 12 such that vehicle interior humidity hc (for example, detected by a humidity sensor not shown) becomes target humidity h0 at the planned departure time t1. In a state where the external power source 24 is connected to the attachment plug 22, pre-air conditioning may be performed using electric power from the external power source 24.

In the case of performing both charging of the electricity storage device (secondary battery) 20 and pre-air conditioning by the external power source 24 before the planned departure time t1 of the vehicle, if the electricity storage device 20 is charged first, the electric power chargeable to the electricity storage device 20 decreases in the case of a low temperature, so that the time taken for charging the electricity storage device 20 increases. As a result, the total time required for both charging the electricity storage device 20 and performing pre-air conditioning increases. Even in the case of a high temperature, as the electric power chargeable to the electricity storage device 20 decreases, the time taken for charging the electricity storage device 20 increases. As a result, the total time required for both charging the electricity storage device 20 and performing pre-air conditioning increases. As such, in the present embodiment, pre-air conditioning is performed before starting charging of the electricity storage device 20 in the case of a low temperature or a high temperature so as to control the temperature of the electricity storage device 20 installed in the vehicle interior. Thereby, a decrease in the electric power chargeable to the electricity storage device 20 is prevented.

Figure 2:
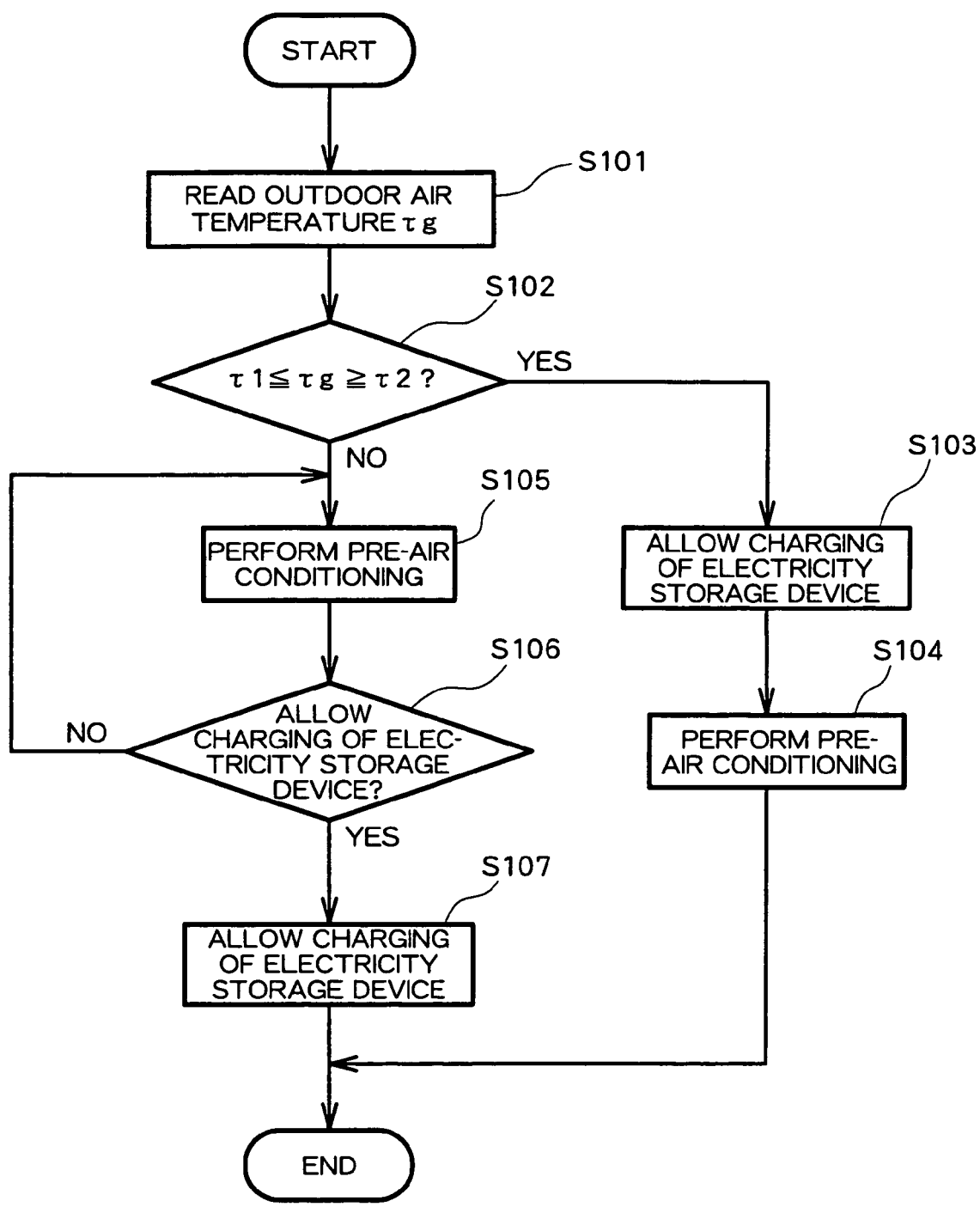
FIG. 2 is a flowchart illustrating processes performed by the air-conditioning control device according to the first embodiment of the present invention.

FIG. 2 is a flowchart illustrating processes performed by the pre-air-conditioning control unit 16 when the electricity storage device 20 is charged and pre-air conditioning is performed by the external power source 24 before the planned departure time t1 of the vehicle. First, at step S101, an outdoor air temperature τg at the present location of the self vehicle is read. The outdoor air temperature τg at this location can be acquired from the information acquisition unit 43 of the navigation system 36, for example. Alternatively, the outdoor air temperature can be directly detected by a temperature sensor, not shown. Next, at step S102, it is determined whether the outdoor air temperature τg is within a set range (whether or not $\tau1 \leq \tau g \leq \tau 2$ is established). This range is set such that the electric power chargeable to the electricity storage device 20 comes to have a predetermined value or greater. If the outdoor air temperature τg is within the set range (if the determination result at step S102 is YES), the process advances to step S103. In contrast, if the outdoor air temperature τg is out of the set range (if the determination result at step S102 is NO), the process advances to step S105.

Figure 3:
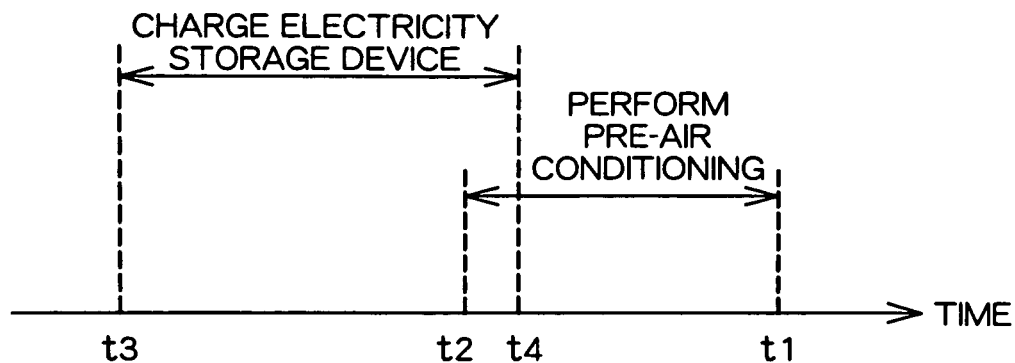
FIG. 3 is a diagram illustrating processes performed by the air-conditioning control device according to the first embodiment of the present invention.

At step S103, charging of the electricity storage device 20 by the external power source 24 is allowed, and charging of the electricity storage device 20 is started. This means, as shown in FIG. 3, that the pre-air-conditioning operation start time t2 is set after a charging start time t3 of the electricity storage device 20. Charging of the electricity storage device 20 is controlled by the charging control circuit 26. At this step, as the electricity storage device 20 can be charged with electric power of a predetermined value or larger, the time required for charging the electricity storage device 20 does not increase. Then, at step S104, operation (pre-air conditioning) of the air conditioner 12 is started such that the vehicle interior temperature τc becomes the target temperature τ0 at the planned departure time t1 of the vehicle. FIG. 3 shows an example where a charging completion time t4 of the electricity storage device 20 becomes later than the pre-air-conditioning operation start time t2. In that case, there is a period during which both charging of the electricity storage device 20 and pre-air conditioning are performed in parallel. However, depending on the conditions of the vehicle interior temperature τc and the target temperature τ0, the pre-air-conditioning operation start time t2 may be later than the charging completion time t4 of the electricity storage device 20.

Figure 4:
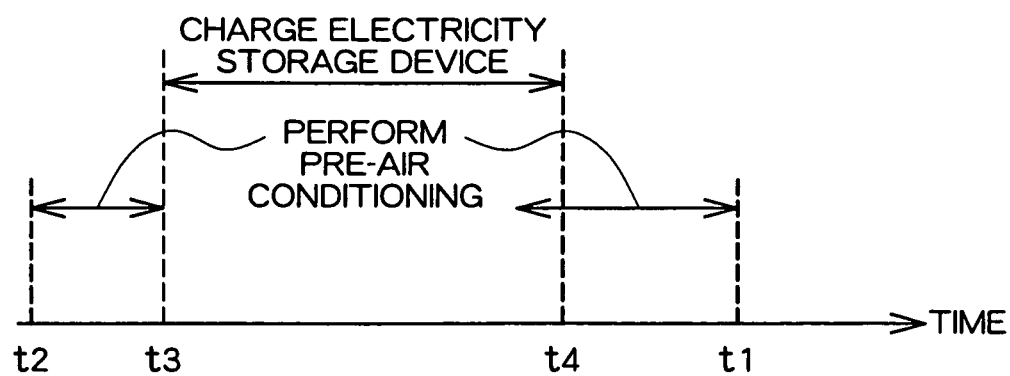
FIG. 4 is a diagram illustrating processes performed by the air-conditioning control device according to the first embodiment of the present invention.

On the other hand, at step S105, operation (pre-air conditioning) of the air conditioner 12 is started. This means, as shown in FIG. 4, that the pre-air-conditioning operation start time t2 is set before the charging start time t3 of the electricity storage device 20. If the outdoor air temperature τg is lower than τ1, by heating the vehicle interior through pre-air conditioning, the temperature τb of the electricity storage device 20 installed in the vehicle interior can be raised, so that the electric power chargeable to the electricity storage device 20 can be increased. In contrast, if the outdoor air temperature τg is higher than τ2, by cooling the vehicle interior through pre-air conditioning, the temperature τb of the electricity storage device 20 installed in the vehicle interior can be lowered, so that the electric power chargeable to the electricity storage device 20 can be increased. At step S106, it is determined whether or not charging of the electricity storage device 20 is allowed. For example, if the temperature τb of the electricity storage device 20 detected by the temperature sensor 21 is within the set range ($\tau1 \leq \tau b \leq \tau 2$ is established), the process advances to step S107, and charging of the electricity storage device 20 is allowed. In contrast, if the temperature τb of the electricity storage device 20 is out of the set range ($\tau1 \leq \tau b \leq \tau 2$ is not established), the process returns to step S105.

At step S107, charging of the electricity storage device 20 by the external power source 24 is allowed, and charging of the electricity storage device 20 is started. Even at this step, as charging of the electricity storage device 20 can be performed with electric power of a predetermined value or larger, the time required for charging the electricity storage device 20 does not increase. If the vehicle interior temperature τc detected by the temperature sensor 11 deviates from the target temperature τ0 after charging of the electricity storage device 20 has been started, pre-air conditioning is performed such that the vehicle interior temperature τc becomes the target temperature τ0 at the planned departure time t1 of the vehicle, as shown in FIG. 4.

As described above, in the present embodiment, when charging of the electricity storage device 20 by the external power source 24 is performed before the planned departure time t1 of the vehicle, it is determined whether to set the pre-air-conditioning operation start time t2 before or after the charging start time t3 of the electricity storage device 20, based on the outdoor air temperature τg. As such, the pre-air-conditioning operation start time t2 varies based on the outdoor air temperature τg. When the outdoor air temperature τg is out of the set range, by setting the pre-air-conditioning operation start time t2 before the charging start time t3 of the electricity storage device 20, the temperature of the electricity storage device 20 can be regulated beforehand by the pre-air conditioning before starting charging of the electricity storage device 20, whereby the electric power chargeable to the electricity storage device 20 can be increased. As a result, the total time required for both charging the electricity storage device 20 and performing pre-air conditioning by the external power source 24 can be reduced. In contrast, when the outdoor air temperature τg is within the set range, the electric power chargeable to the electricity storage device 20 can be sufficiently secured even if the pre-air-conditioning operation start time t2 is set after the charging start time t3 of the electricity storage device 20. As such, the time required for charging the electricity storage device 20 does not increase. As described above, according to the present embodiment, as the total time required for both charging the electricity storage device 20 and performing pre-air conditioning by the external power source 24 can be reduced, a pre-air conditioning period for causing the vehicle interior temperature τc to be the target temperature τ0 can be sufficiently secured, whereby pre-air conditioning can be performed more appropriately.

In the processes in the flowchart shown in FIG. 2, the temperature τb of the electricity storage device 20 detected by the temperature sensor 11 may be used instead of the outdoor air temperature τg. This means, in the case of charging the electricity storage device 20 by the external power source 24 before the planned departure time t1 of the vehicle, the pre-air-conditioning operation start time t2 can be varied based on the outdoor air temperature τg by determining whether to set the pre-air-conditioning operation start time t2 before or after the charging start time t3 of the electricity storage device 20 based on the temperature τb of the electricity storage device 20. In that case, when the temperature τb of the electricity storage device 20 is out of the set range, the pre-air-conditioning operation start time t2 can be set before the charging start time t3 of the electricity storage device 20, and when the temperature τb of the electricity storage device 20 is within the set range, the pre-air-conditioning operation start time t2 can be set after the charging start time t3 of the electricity storage device 20. Even in this case, the total time required for both charging the electricity storage device 20 and performing pre-air conditioning by the external power source 24 can be reduced.

In the above description, it has been described that charging of the electricity storage device 20 is not started when pre-air conditioning is performed at step S105 in the flowchart shown in FIG. 2. However, in the present embodiment, when pre-air conditioning is performed at step S105, charging of the electricity storage device 20 can be performed while limiting the electric power to be charged. A limit value of the electric power to be charged in that case may be set based on the temperature τb of the electricity storage device 20. In such a case, the limitation of the electric power to be charged to the electricity storage device 20 is released when the temperature τb of the electricity storage device 20 comes into the set range, for example.

Further, in the above description, it has also been described that inputs including a request for performing pre-air conditioning, the planned departure time t1 of the vehicle, and the target temperature τ0 inside the vehicle interior are received by means of the operation input receiving unit 44 of the navigation system 36. However, in the present embodiment, inputs including a request for performing pre-air conditioning, the planned departure time t1 of the vehicle, and the target temperature τ0 inside the vehicle interior may be received by means of another operation input receiving unit provided separately from the navigation system 36 (e.g., air-conditioning control panel).

Second Embodiment

Figure 5:
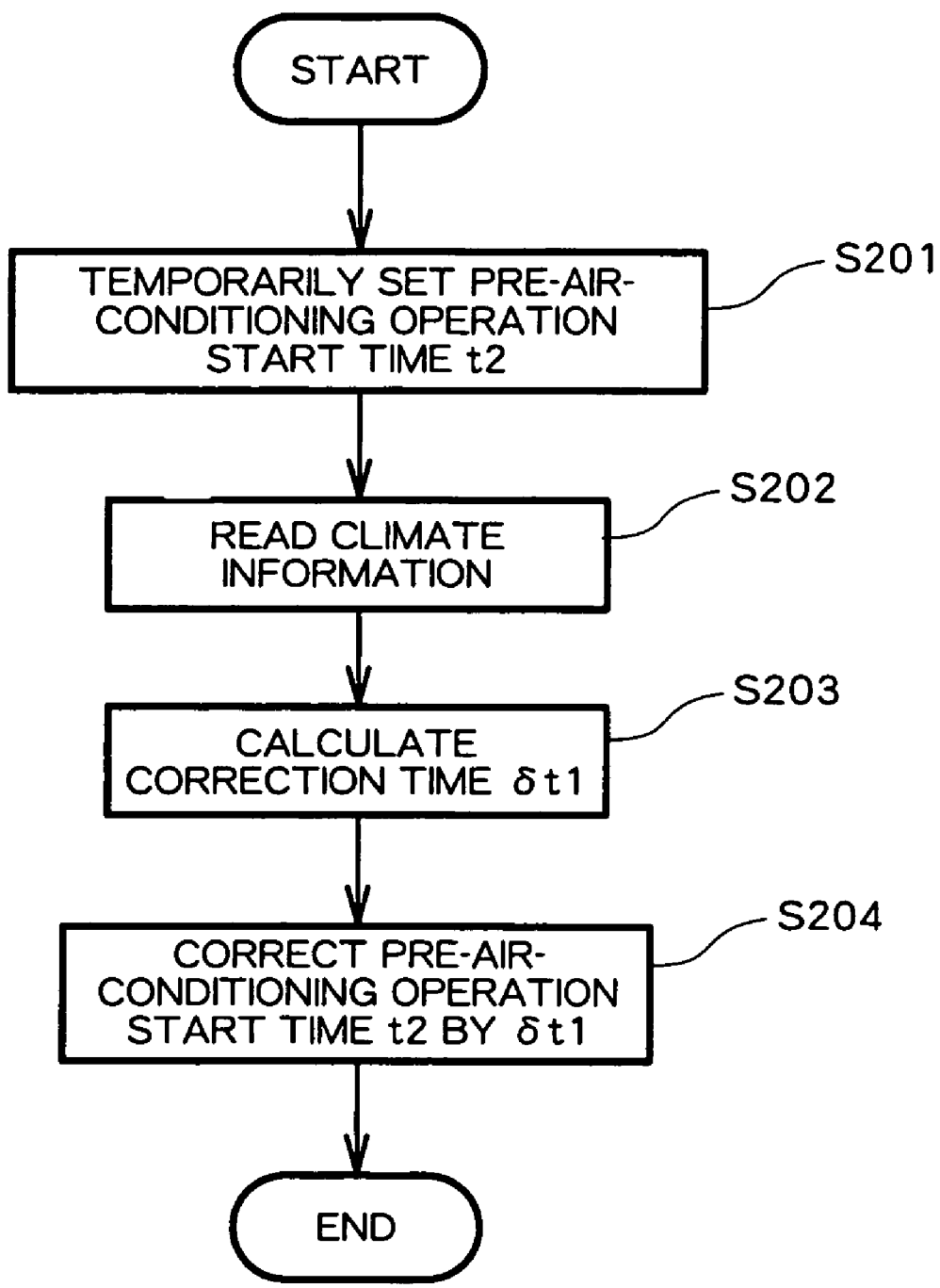
FIG. 5 is a flowchart illustrating processes performed by an air-conditioning control device according to a second embodiment of the present invention.

FIG. 5 is a flowchart illustrating processes performed by an air-conditioning control device according to a second embodiment of the present invention. As the configuration of a vehicle having the air-conditioning control device according to the second embodiment is the same as that of the first embodiment, the description is not repeated.

First, at step S201, the pre-air-conditioning start time t2 is temporarily set based on the planned departure time t1 and the target temperature τ0 from the operation input receiving unit 44. Then, at step S202, climate information is read. This climate information includes weather, an outdoor air temperature τg, and an outdoor air humidity hg, which can be acquired from the information acquiring unit 43 of the navigation system 36.

Figure 6:
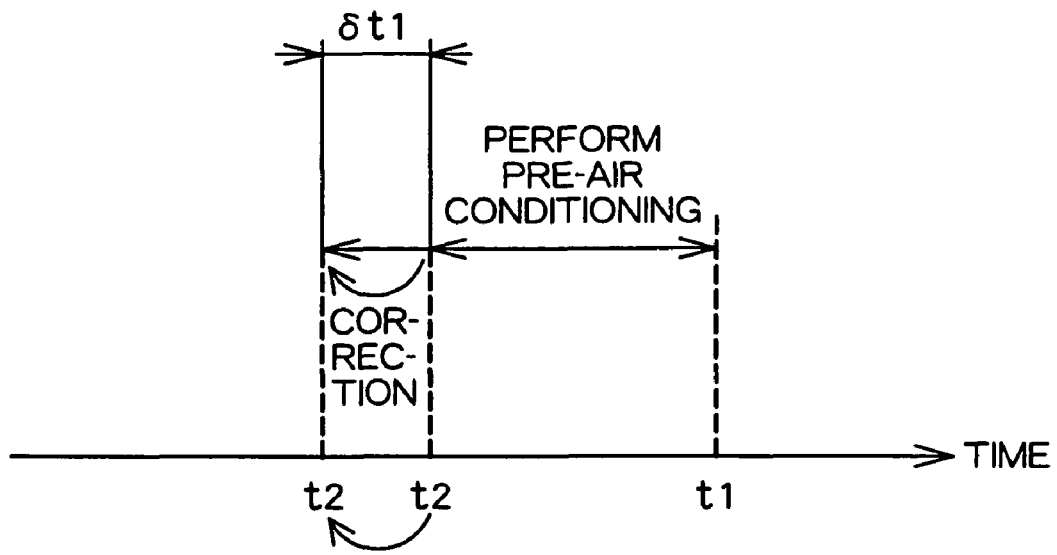
FIG. 6 is a diagram illustrating processes performed by the air-conditioning control device according to the second embodiment of the present invention.

Next, at step S203, a correction time δt1 for the pre-air-conditioning operation start time t2 is calculated based on the climate information read at step S202. At step S204, the pre-air-conditioning operation start time t2 is corrected by the correction time δt1 calculated at step S203. FIG. 6 shows an example of correcting the pre-air-conditioning operation start time t2 in an advancing direction. In an example of calculating the correction time δt1 based on the outdoor air temperature τg, when the vehicle interior temperature τc is lower than the target temperature τ0 and the vehicle interior is to be heated by pre-air conditioning, if the outdoor air temperature τg at the present location of the self vehicle is lower than the set temperature, the correction time δt1 is determined so as to make the pre-air-conditioning operation start time t2 earlier than the time temporarily set at step S201. In contrast, in the case of heating the vehicle interior, if the outdoor air temperature τg at the present location of the self vehicle is higher than the set temperature, the correction time δt1 is determined so as to make the pre-air-conditioning operation start time t2 later than the time temporarily set at step S201. Further, when the vehicle interior temperature τc is higher than the target temperature τ0 and the vehicle interior is to be cooled by pre-air conditioning, if the outdoor air temperature τg at the present location of the self vehicle is lower than the set temperature, the correction time δt1 is determined so as to make the pre-air-conditioning operation start time t2 later than the time temporarily set at step S201. In contrast, in the case of cooling the vehicle interior, if the outdoor air temperature τg at the present location of the self vehicle is higher than the set temperature, the correction time δt1 is determined so as to make the pre-air-conditioning operation start time t2 earlier than the time temporarily set at step S201. Although the vehicle interior temperature τc is not easily raised when the outdoor air temperature τg is low and the vehicle interior temperature τc is not easily dropped when the outdoor air temperature τg is high, the vehicle interior temperature τc can be made a proper temperature at the planned departure time t1 by correcting the pre-air-conditioning operation start time t2 based on the outdoor air temperature τg.

Further, in an example of calculating the correction time δt1 based on the outdoor air humidity hg, in the case of heating the vehicle interior by pre-air conditioning, if the outdoor air humidity hg is lower than the set humidity, the correction time δt1 is determined so as to make the pre-air-conditioning operation start time t2 earlier than the time temporarily set at step S201. In contrast, in the case of heating the vehicle interior, if the outdoor air humidity hg is higher than the set humidity, the correction time δt1 is determined so as to make the pre-air-conditioning operation start time t2 later than the time temporarily set at step S201. Further, in the case of cooling the vehicle interior by pre-air conditioning, if the outdoor air humidity hg is lower than the set humidity, the correction time δt1 is determined so as to make the pre-air-conditioning operation start time t2 later than the time temporarily set at step S201. In contrast, in the case of cooling the vehicle interior by pre-air conditioning, if the outdoor air humidity hg is higher than the set humidity, the correction time δt1 is determined so as to make the pre-air-conditioning operation start time t2 earlier than the time temporarily set at step S201.

Further, in an example of calculating the correction time δt1 based on the weather, in the case of heating the vehicle interior by pre-air conditioning, if the weather at the present location of the self vehicle is fine, the correction time δt1 is determined so as to make the pre-air-conditioning operation start time t2 later than the time temporarily set at step S201. In contrast, in the case of heating the vehicle interior by pre-air conditioning, if the weather at the present location of the self vehicle is rainy or snowy, the correction time δt1 is determined so as to make the pre-air-conditioning operation start time t2 earlier than the time temporarily set at step S201. Further, in the case of cooling the vehicle interior by pre-air conditioning, if the weather at the present location of the self vehicle is fine, the correction time δt1 is determined so as to make the pre-air-conditioning operation start time t2 earlier than the time temporarily set at step S201. In contrast, in the case of cooling the vehicle interior by pre-air conditioning, if the weather at the present location of the self vehicle is rainy or snowy, the correction time δt1 is determined so as to make the pre-air-conditioning operation start time t2 later than the time temporarily set at step S201. The correction time δt1 may be determined based on a combination of two or more of the outdoor air temperature τg, the outdoor air humidity hg, and the weather.

As described above, in the present embodiment, by changing the pre-air-conditioning operation start time t2 based on climate information such as an outdoor air temperature, an outdoor air humidity hg, and weather, the vehicle interior temperature τc at the planned departure time t1 can be made a proper temperature by adapting to the climate conditions at the place where the vehicle locates. As such, pre-air conditioning can be performed more appropriately.

Figure 7:
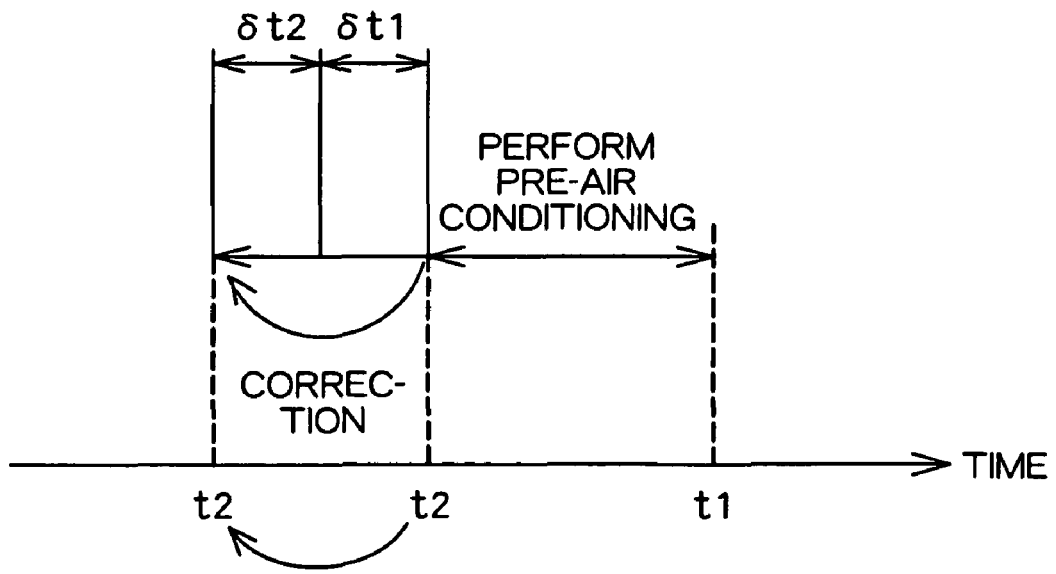
FIG. 7 is a diagram illustrating other processes performed by the air-conditioning control device according to the second embodiment of the present invention.

In the present embodiment, it is also possible to calculate a correction time δt2 (to change the pre-air-conditioning operation start time t2) based on the number of planned occupants of the vehicle. In that case, the operation input receiving unit 44 can receive an input of the number of planned occupants of the vehicle made by the operator. In the case of heating the vehicle interior by pre-air conditioning, if the number of planned occupants is larger than the predetermined number, the correction time δt2 may be determined so as to make the pre-air-conditioning operation start time t2 later than the time temporarily set at step S201. In contrast, in the case of heating the vehicle interior by pre-air conditioning, if the number of planned occupants is smaller than the predetermined number, the correction time δt2 may be determined so as to make the pre-air-conditioning operation start time t2 earlier than the time temporarily set at step S201. On the other hand, in the case of cooling the vehicle interior by pre-air conditioning, if the number of planned occupants is larger than the predetermined number, the correction time δt2 may be determined so as to make the pre-air-conditioning operation start time t2 earlier than the time temporarily set at step S201. In contrast, in the case of cooling the vehicle interior by pre-air conditioning, if the number of planned occupants is smaller than the predetermined number, the correction time δt2 may be determined so as to make the pre-air-conditioning operation start time t2 later than the time temporarily set at step S201. Further, as shown in FIG. 7, the pre-air-conditioning operation start time t2 may be corrected by the correction time δt1+δt2. FIG. 7 shows an example of correcting the pre-air-conditioning operation start time t2 in an advancing direction. Although the vehicle interior temperature τc is subject to rising as the number of occupants in the vehicle increases, the vehicle interior temperature τc can be made a proper temperature corresponding to the number of occupants of the vehicle by changing the pre-air-conditioning operation start time t2 according to the number of planned occupants of the vehicle. As such, pre-air conditioning can be performed more appropriately.

While the present invention has been described with reference to the embodiments, the present invention is not limited to these embodiments. It is understood that various changes may be made therein without departing from the scope of the present invention.

The invention claimed is:

1. An air conditioning control device for a vehicle, comprising:
    an air conditioner for conditioning air in a vehicle interior;
    an input receiving unit for receiving inputs of a planned departure time of the vehicle and a target temperature of the vehicle interior;
    a pre-air-conditioning control unit for starting operation of the air conditioner at an air conditioning operation start time before the planned departure time so that a temperature in the vehicle interior at the planned departure time becomes the target temperature; and
    an outdoor air temperature acquisition unit for acquiring an outdoor air temperature, wherein
    the pre-air-conditioning control unit changes the air conditioning operation start time based on the outdoor air temperature acquired by the outdoor air temperature acquisition unit,
    the air conditioner conditions the air in the vehicle interior where an electricity storage device chargeable by an external power source is installed, and
    when the electricity storage device is charged by the external power source before the planned departure time, the pre-air conditioning control unit determines to set the air conditioning operation start time earlier or later than a charging start time of the electricity storage device, based on the outdoor air temperature acquired by the outdoor air temperature acquisition unit.

2. The air conditioning control device for the vehicle, according to claim 1, wherein
    when the electricity storage device is charged by the external power source before the planned departure time, if the outdoor air temperature acquired by the outdoor air temperature acquisition unit is out of a set range, the pre-air-conditioning control unit sets the air conditioning operation start time earlier than the charging start time of the electricity storage device.

3. The air conditioning control device for the vehicle, according to claim 1, wherein
    when the electricity storage device is charged by the external power source before the planned departure time, if the outdoor air temperature acquired by the outdoor air temperature acquisition unit is within a set range, the pre-air-conditioning control unit sets the air conditioning operation start time later than the charging start time of the electricity storage device.

4. A vehicle, comprising the air conditioning control device according to claim 1, and capable of traveling by means of electric power supplied from an electricity storage device to an electric motor.

5. An air conditioning control device for a vehicle, comprising:
    an air conditioner for conditioning air in a vehicle interior;
    an input receiving unit for receiving inputs of a planned departure time of the vehicle and a target temperature of the vehicle interior;
    a pre-air-conditioning control unit for performing pre-air conditioning to start operation of the air conditioner at an air conditioning operation start time before the planned departure time so that a temperature in the vehicle interior at the planned departure time becomes the target temperature; and
    an outdoor air temperature acquisition unit for acquiring an outdoor air temperature, wherein
    the air conditioner conditions the air in the vehicle interior where an electricity storage device chargeable by an external power source is installed, and
    the pre-air-conditioning control unit is capable of regulating a temperature of the electricity storage device by performing the pre-air conditioning, and changes the air conditioning operation start time based on the outdoor air temperature acquired by the outdoor air temperature acquisition unit.

6. The air conditioning control device for the vehicle, according to claim 5, wherein
    when the electricity storage device is charged by the external power source before the planned departure time, the pre-air-conditioning control unit changes the air conditioning operation start time based on the outdoor air temperature acquired by the outdoor air temperature acquisition unit.

7. The air conditioning control device for the vehicle, according to claim 6, wherein
when the electricity storage device is charged by the external power source before the planned departure time, if the outdoor air temperature acquired by the outdoor air temperature acquisition unit is out of a set range, the pre-air-conditioning control unit sets the air conditioning operation start time earlier than the charging start time of the electricity storage device.

8. The air conditioning control device for the vehicle, according to claim 6, wherein
when the electricity storage device is charged by the external power source before the planned departure time, if the outdoor air temperature acquired by the outdoor air temperature acquisition unit is within a set range, the pre-air-conditioning control unit sets the air conditioning operation start time later than the charging start time of the electricity storage device.

9. A vehicle, comprising the air conditioning control device according to claim 5, and capable of traveling by means of electric power supplied from an electricity storage device to an electric motor.

10. An air conditioning control device for a vehicle, comprising:
an air conditioner for conditioning air in a vehicle interior;
an input receiving unit for receiving inputs of a planned departure time of the vehicle and a target temperature of the vehicle interior; and
a pre-air-conditioning control unit for starting operation of the air conditioner at an air conditioning operation start time before the planned departure time so that a temperature in the vehicle interior at the planned departure time becomes the target temperature, wherein
the air conditioner is operable by an external power source capable of charging an electricity storage device installed in the vehicle interior, and the air conditioning control device comprises an electricity storage device temperature acquisition unit for acquiring a temperature of the electricity storage device, and
when the electricity storage device is charged by the external power source before the planned departure time, the pre-air-conditioning control unit changes the air conditioning operation start time based on the temperature of the electricity storage device acquired by the electricity storage device temperature acquisition unit.

11. The air conditioning control device for the vehicle, according to claim 10, wherein
when the electricity storage device is charged by the external power source before the planned departure time, the pre-air-conditioning control unit determines to set the air conditioning operation start time earlier or later than a charging start time of the electricity storage device, based on the temperature of the electricity storage device acquired by the electricity storage device temperature acquisition unit.

12. The air conditioning control device for the vehicle, according to claim 11, wherein
when the electricity storage device is charged by the external power source before the planned departure time, if the temperature of the electricity storage device acquired by the electricity storage device temperature acquisition unit is out of a set range, the pre-air-conditioning control unit sets the air conditioning operation start time earlier than the charging start time of the electricity storage device.

13. The air conditioning control device for the vehicle, according to claim 11, wherein
when the electricity storage device is charged by the external power source before the planned departure time, if the temperature of the electricity storage device acquired by the electricity storage device temperature acquisition unit is within a set range, the pre-air-conditioning control unit sets the air conditioning operation start time later than the charging start time of the electricity storage device.

14. A vehicle, comprising the air conditioning control device according to claim 10, and capable of traveling by means of electric power supplied from an electricity storage device to an electric motor.

* * * * *